(12) United States Patent
Shoemaker et al.

(10) Patent No.: US 6,313,435 B1
(45) Date of Patent: Nov. 6, 2001

(54) MASK ORBITING FOR LASER ABLATED FEATURE FORMATION

(75) Inventors: Curtis L. Shoemaker, Round Rock; Luis A. Aguirre, Austin, both of TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/196,962

(22) Filed: Nov. 20, 1998

(51) Int. Cl.[7] .............................. B23K 26/38; B23K 26/06
(52) U.S. Cl. .................................. 219/121.7; 219/121.71; 219/121.73
(58) Field of Search ........................... 219/121.7, 121.71, 219/121.73, 121.74, 121.75, 121.68, 121.69; 347/47

(56) References Cited

U.S. PATENT DOCUMENTS

| | | | |
|---|---|---|---|
| 4,118,109 | 10/1978 | Crawford et al. | 350/285 |
| 4,467,170 | * 8/1984 | Hata et al. | |
| 4,733,944 | 3/1988 | Fahlen et al. | 350/167 |
| 4,923,772 | * 5/1990 | Kirch et al. | |
| 4,940,881 | 7/1990 | Sheets | 219/121.69 |
| 5,160,823 | 11/1992 | Bennin et al. | 219/121.68 |
| 5,298,351 | 3/1994 | Bobroff et al. | 430/5 |
| 5,378,137 | * 1/1995 | Asakawa et al. | 219/121.71 |
| 5,414,559 | 5/1995 | Burghardt et al. | 359/623 |
| 5,467,115 | 11/1995 | Childers | 347/47 |
| 5,609,778 | 3/1997 | Pulaski et al. | 219/121.69 |
| 5,610,733 | 3/1997 | Feldman et al. | 359/9 |
| 5,841,101 | * 11/1998 | Nishiwaki | 219/121.71 |
| 5,905,020 | * 5/1999 | Hu et al. | |
| 5,912,467 | * 6/1999 | Okino | |
| 5,997,134 | * 12/1999 | Hotomi et al. | |
| 6,008,468 | * 12/1999 | Tanaka et al. | 219/121.71 |

FOREIGN PATENT DOCUMENTS

| | | |
|---|---|---|
| 0 495 649 A1 | 7/1992 | (EP) . |
| 0 549 357 A1 | 12/1992 | (EP) . |
| 7-304179 | 11/1995 | (JP) . |
| 8-99185 | * 4/1996 | (JP) . |
| 8-155667 | * 6/1996 | (JP) . |
| 10-6065 | * 1/1998 | (JP) . |
| 10-146683 | * 6/1998 | (JP) . |

* cited by examiner

*Primary Examiner*—Geoffrey S. Evans
(74) *Attorney, Agent, or Firm*—Matthew B. McNutt; Darla P. Fonseca (57) ABSTRACT

A Method and Apparatus for ablating features from a substrate, such as drilling holes in a polymer substrate for an ink jet printhead, by illuminating the substrate that has passed through a mask that is continuously orbited or moved in a two dimensional pattern. The mask is capable of following a trajectory perpendicular to the angle of the radiation.

20 Claims, 7 Drawing Sheets

MASK ORBITING FOR LASER ABLATED FEATURE FORMATION

BACKGROUND OF INVENTION

1. Field of Invention

This invention pertains to a method and an apparatus that forms ablated features in substrates such as by laser ablation of polymer substrates for inkjet print head applications.

2. Description of the Related Art

The laser ablation of features on polymer materials using a mask and imaging lens system is well known. In this process, features on the mask are illuminated with laser light. The laser light that passes through the transparent features of the mask is then imaged onto the substrate such as a polymeric film where the ablation process occurs.

Figure 1:
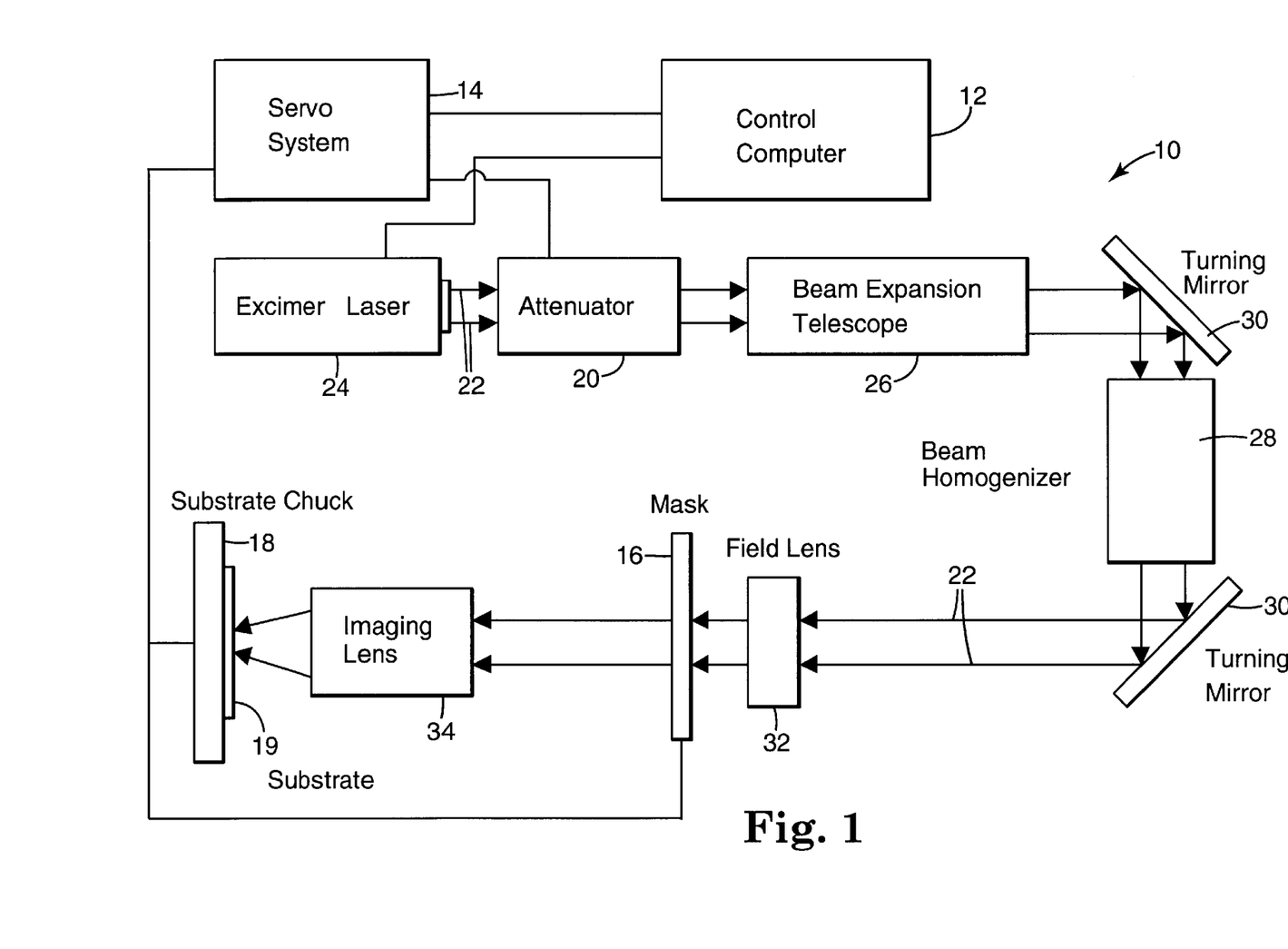
FIG. 1 illustrates a typical laser machining system employing a mask for irradiating a substrate.

FIG. 1 illustrates a basic layout of a conventional excimer laser machining system 10. Typically, the system 10 is controlled by a computer 12 with an interface to the operator of the system. The computer 12 controls the firing of the pulsed laser system 24 and a low speed, low resolution servo system 14. The function of the servo system 14 is to position the mask 16 and substrate chuck 18 for proper registration of the laser milled pattern with respect to other features on the substrate 19 prior to ablation of substrate 19. For this purpose, a vision system (not shown) is often interfaced to the computer system. The servo system 14 or computer 12 may control an attenuator module 20, to vary the amount of UV radiation entering the system. Alternatively, the laser pulse energy may be varied by adjusting the laser high voltage or a control set point for energy, maintained by the laser's internal pulse energy control loop.

The UV beam path is indicated in this figure with arrows 22 (not intended to be actual ray paths, which are not typically parallel) which show the flow of UV energy within the system. The UV power originates at the pulsed excimer laser 24. The laser 24 typically fires at 100–300 Hz for economical machining with pulses that have a duration of about 20–40 nanoseconds each. The typical industrial excimer laser is 100–150 watts of time average power, but peak powers may reach megawatts due to the short duration of the pulse. These high peak powers are important in machining many materials.

From the output end of the laser, the UV energy typically traverses attenuator 20; however, this is an optional component not present in all laser machining systems. The attenuator 20 performs either or both of two possible functions. In the first function, the attenuator 20 compensates for the degradation of the optical train. The attenuator 20 thus used, allows the laser to run in a narrow band of pulse energies (and hence a restricted range of high voltage levels), allowing for more stable operation over the long term. With new optics in the system, the attenuator 20 is set to dissipate some of the power of the laser. As the optics degrade and begin to absorb energy themselves, the attenuator 20 is adjusted to provide additional light energy. For this function, a simple manual attenuator plate or plates can be used. The attenuator plates are typically quartz or fused silica plates with special dielectric coatings on them to redirect some of the laser energy toward an absorbing beam dump within the attenuator housing.

The other possible function of the attenuator 20 is for short term control of laser power. In this case, the attenuator 20 is motorized with either stepper motors or servo system, and the attenuator is adjusted to provide the correct fluence (energy per unit area) at the substrate for proper process control.

From the attenuator 20, the UV energy propagates to a beam expansion telescope 26 (optional). The beam expansion telescope 26 serves the function of adjusting the cross sectional area of the beam to properly fill the entrance to the beam homogenizer 28. This has an important effect on the overall system resolution by creating the correct numerical aperture of illumination upon exit from the homogenizer. Typical excimer laser beams are not symmetric in horizontal vs. vertical directions. Typically, the excimer beam is described as "top hat-gaussian," meaning that between the laser discharge direction (usually vertical), the beam profile is "top hat" (initially relatively flat and dropping off sharply at the edges). In the transverse direction, the beam has a typical intensity profile that looks qualitatively gaussian, like a normal probability curve.

The expansion telescope 26 allows some level of relative adjustment in the distribution of power in these directions, which reduces (but does not completely eliminate) distortion of the pattern being imaged onto the substrate 19 due to the resolution differences in these two axes.

Between the expansion telescope 26 and homogenizer 28 is shown a flat beam folding mirror 30. Most systems, due to space limitations, will contain a few such mirrors 30 to fold the system into the available space. Generally, the mirrors may be placed between components, but in some areas, the energy density or fluence can be quite high. Therefore, mirror locations are carefully chosen to avoid such areas of high energy density. In general, the designer of such a system will try to limit the number of folding mirrors 30 in order to minimize optics replacement cost and alignment difficulty.

The UV light next enters the beam homogenizer 28. The purpose of the homogenizer 28 is to create a uniformly intense illumination field at the mask plane. It also determines the numerical aperture of the illumination field (the sine of the half angle of the cone of light impinging on the mask), which as stated above, has an impact on overall system resolution. Since certain parts of the excimer beam are hotter than others, uniform illumination requires that the beam be parsed into smaller segments which are stretched and overlaid at the mask plane. Several methods for this are known in the art, with some methods being based on traditional refractive optics, e.g., as disclosed in U.S. Pat. Nos. 4,733,944 and 5,414,559, both of which are incorporated herein by reference. The method may also be based on diffractive or holographic optics, as in U.S. Pat. No. 5,610,733, both of which patents are incorporated by reference, or on continuous relief microlens arrays (described in "Diffractive microlenses replicated in fused silica for excimer laser-beam homogenizing", Nikoladjeff, et. al, Applied Optics, Vol 36, No. 32, pp. 8481–8489, 1997).

From the beam homogenizer 28 the light propagates to a field lens 32, which serves to collect the light from the homogenizer 28 and properly couple it into the imaging lens 34. The field lenses 32 may be simple spherical lenses, cylindrical lenses, anamorphic or a combination thereof, depending on the application. Careful design and placement of field lenses 32 are important in achieving telecentric imaging on the substrate side of the lens 32.

The mask 16 is typically placed in close proximity to the field lens 32. The mask 16 carries a pattern that is to be replicated on the substrate 19. The pattern is typically larger (2 to 5 times) than the size of the pattern desired on the substrate 19. The imaging lens 34 is designed to de-magnify the mask 16 in the course of imaging it onto the substrate 19. This has the desired property of keeping the UV energy density low at the mask plane and high at the substrate plane. High de-magnification usually imposes a limit on the field size available at the substrate plane.

The mask 16 may be formed from chromium or aluminum coated on a quartz or fused silica substrate with the pattern being etched into the metallic layer by photolithography or other known means. Alternatively, the reflecting and/or absorbing layer on the fused silica mask substrate 16 may comprise a sequence of dielectrics layers, such as those disclosed in U.S. Pat. Nos. 4,923,772 and 5,298,351, both of which are incorporated herein by reference.

The purpose of the imaging lens 34 is to de-magnify and relay the mask pattern onto the substrate 19. If the pattern is reduced by a factor of M in each dimension, then the energy density is raised by $M^2$ multiplied by the transmission factor of the imaging lens 34 (typically 80% or so). In its simplest form, the imaging lens 34 is a single element lens. Typically, the imaging lens 34 is a complex multi-element lens designed to reduce various aberration and distortions in the image. The imaging lens 34 is preferably designed with the fewest elements necessary to accomplish the desired image quality in order to increase the optical throughput and to decrease the cost of the imaging lens 34. Typically, the imaging lens 34 is one of the most expensive parts of the beam train.

As noted above, the imaging lens 34 creates a de-magnified image of the pattern of the mask 16 on the substrate 19. Each time the laser fires, an intense patterned area is illuminated on the substrate 19. As a result, etching of the substrate material results at the illuminated areas. Many substrate materials may be so imaged, especially polymeric materials. Polyimides available under various trade names such as Kapton™ and Upilex™ are the most common for microelectronic applications and inkjet applications.

The system 10 described in FIG. 1 is a "typical" system. For non-demanding applications, the system can be further simplified and still produce ablated parts, but with some sacrifice in feature tolerances, repeatability, or both. It is not unusual for systems to make some departure from this typical architecture, driven by the particular needs of the application.

There are many applications for laser ablation of polymeric materials. Some applications or portions thereof are not demanding in terms of tolerances, e.g., electrical vias, and the emphasis is on small size, high density features and low cost. Other applications require very demanding tolerances and repeatability. Examples of the latter applications are fluid flow applications such as inkjet print head nozzle manufacture and manufacture of drug dispensing nozzles. In these demanding applications, the requirements for exact size, shape, and repeatability of manufacture are much more stringent than the simpler conductive path features provided by a microelectronic via. The detailed architecture of the system is critical to obtaining tight tolerances and product repeatability. In addition, process parameters and the optical components all play important roles in obtaining the tightest possible tolerances, down to the sub-micron level.

As mentioned above, the invention relates to the formation of nozzles for inkjet print head applications and other fluid flow applications. During the firing of a thermal inkjet print head, a small volume of ink is vaporized. The vaporized ink causes a droplet of ink to shoot through an orifice (i.e., the nozzle) which is directed at the print media. The quality of thermal inkjet printing is dependent upon the characteristics of the orifice. Critical attributes of the orifice include the shape and surface condition of the bore.

One important aspect for fluid flow applications is the slope of the via walls. Vias made in the conventional manner have very steep wall slopes, with the slope dependent upon the incident radiation fluence (energy per unit area), and to a lesser extent, the number of laser pulses used to create the feature. Using conventional methods, very little can effectively be done to control or shape the via wall slope. One method is controlling the energy distribution of the radiation hitting the substrate. In a projection imaging system, this can be accomplished by placing ring shaped apertures on the mask, such as described in U.S. Pat. No. 5,378,137. However, the mask features used to create the hole profiles must be very small (sub-resolution for the imaging system), or they may be imaged into the ablated hole or via. The disadvantage of this method is that the small mask features can easily be damaged and also add difficulty and expense to the mask making process.

In a typical inkjet print head made currently in the industry, small ablated orifices or vias are made in the polymer film substrate at a concentration of about 300 or more ablated orifices per inch. The size of the orifices may vary depending upon the particular application, but generally have an exit diameter less than about 35 microns. The entrance orifice diameter is typically less than 100 microns, with an average entrance diameter of about 50 microns to about 60 microns being more typical. The objective of the invention described herein is to provide additional control over the shape of the orifice in addition to the traditional process controls of mask features, fluence, laser shots, and so forth in controlling the detailed shape of the orifice.

In addition to the ring-mask method described above, another method of shaping the orifice wall angle is to displace the beam using an optical method. This can be accomplished, for example, by spinning a flat or wedge-shaped optical element between the mask and projection lens. Such a method is described in U.S. Pat. No. 4,940,881. Placing a spinning element between the mask and the projection lens has the effect of moving the image in a circular orbit. This motion changes the ablated feature profile by moving the incident light at the surface of the substrate. The disadvantage of the method of U.S. Pat. No. 4,940,881 is that the radius of the orbit cannot be easily changed during the machining cycle. If the optical elements are wedge-shaped, as described in U.S. Pat. No. 4,118,109, the method also has the disadvantage that the angle of the beam is altered during the orbit, which limits the smallest possible beam displacement and complicates process control. An additional limitation is that hole wall slope profiles are limited to concave geometry (see FIG. 6), when used in conjunction with a conventional laser mask (e.g. one with simple apertures in the reflecting or absorbing coating for each ablated feature), except at very low fluences.

An apparatus and method for controlling an ablated orifice shape using two rotating optical elements is described in co-pending U.S. patent application Ser. No. 09/197,127, now U.S. Pat. No. 6,120,976, entitled "LASER ABLATED FEATURE FORMATION DEVICE" filed on like date herewith, and incorporated by reference herein. The invention of copending U.S. patent application Ser. No. 09/197, 127 has the advantage over U.S. Pat. No. 4,940,881 in that the profile of the hole wall can be altered by controlling the relative rotational velocities and phase angle between the two rotating optical elements. In this manner, any desired hole profile (i.e., concave, convex or straight) can be obtained without requiring a complicated mask structure.

Yet another method for moving the image on the substrate utilizes a movable mirror between the mask and the projection lens. The mirror can be tilted in such a manner that the image moves in a prescribed orbit, thereby moving the incident light at the substrate. A major disadvantage of this method is the limited sensitivity of control, since a small tilt of the mirror can be a rather large displacement of the apparent mask position. Further, such mirrors must be of a minimum thickness to insure sufficient mechanical stability and flatness of the reflecting surface. This in turn, makes for a rather large inertia, and limits the bandwidth or highest speed of the device. When the system bandwidth is limited, it places limits on the scan patterns that can be effectively used to shape the holes.

An alternative to optically or mechanically moving the mask image is to actually move the substrate. This has a disadvantage, however, that the motion of the substrate must be very precise. The requirement for high precision is due to the fact that the projection lens of the ablation system shrinks the projection mask image down to the substrate to concentrate the laser energy. Consequently, the tolerances on the motion profile also shrink proportionately. This approach usually has the same inertial problems as the tilting mirror approach discussed above, except that the problem is further aggravated by additional mass of the substrate holders and motion stages used in typical automated systems.

As can be seen, there are multiple ways by which the profile of a laser ablated feature may be controlled to some degree. However, it can also be seen that the currently available methods have limitations which restrict their usefulness. What is needed, therefore, and what is provided by the present invention, is an apparatus and method for controlling the profile of laser ablated features which is very flexible in allowing the creation of multiple types of orifice profiles, while at the same time providing accurate and repeatable results. In the present invention, the mask itself is continually moved according to a prescribed set of coordinates for each and every laser pulse. The detailed trajectory of this motion has a strong influence on the final ablated hole shape. The ability to change the hole geometry without any additional optical element is a powerful yet flexible process parameter. Moving the mask itself within a certain prescribed trajectory can change the geometry of the ablated feature in a desirable fashion, including convex, concave and straight-walled features.

SUMMARY OF INVENTION

The present invention provides a method of improving the geometry of laser ablated features. In the method of the invention, the mask is moved at high speed and high resolution during the ablation process in a plane perpendicular to the optical axis of the system, thereby causing the image to move in a like way and change the geometry of the ablated feature on the substrate. The mask can be moved in any desired pattern, such as a circular pattern, spiral pattern, or more general scan pattern to create the desired shape of the wall slope of the ablated feature. The ablated feature can be made oval by moving the mask in an elliptical orbit during the machining cycle.

In one broad respect, this invention provides a process useful for ablating features in a substrate, comprising: irradiating the substrate with radiation that has passed through a mask to form an ablated feature in the substrate, wherein the mask is orbited perpendicular to the optical axis during formation of the feature thereby forming a selected wall shape.

The process of this invention may be employed to ablate a variety of materials. For instance, the process may be used to etch or expose patterns in organic or inorganic photoresist during semiconductor fabrication using a variety of radiation sources such as X-rays and ultraviolet light including deep ultraviolet light. The process of this invention can be employed to ablate features in substrates that either completely traverse the substrate, i.e., holes or vias, or features with a given depth which is less than the total depth of the substrate, often described as a "blind" feature.

In yet another broad respect, this invention provides an apparatus useful for making holes in a substrate, comprising: a radiation source; a mask positioned between the radiation source and a substrate to be irradiated with radiation from the radiation source, wherein the mask is capable of moving perpendicular to the system optical axis when the substrate is being irradiated such that a different feature shape is formed than would have been formed if the mask were not orbited.

As used herein, the term "laser feature" includes holes, bores, vias, nozzles, orifices and the like, and may be fully ablated through the substrate or only partially through the substrate ("blind" features).

DETAILED DESCRIPTION OF THE INVENTION

As discussed above, FIG. 1 illustrates the basic layout of a conventional excimer laser machining system 10, including servo system 14 control of mask 16, substrate chuck 18 and attenuator 20. As noted above, in the typical system 10 of FIG. 1 servo system 14 is a low speed, low resolution system which functions to properly register mask 16 and substrate 19 prior to ablation of substrate 19. Servo system 14 does not move during the ablation process and only provides gross movement of mask 16 and substrate 19 (movements on the order of several millimeters) to align mask 16 and substrate 19.

Figure 2:
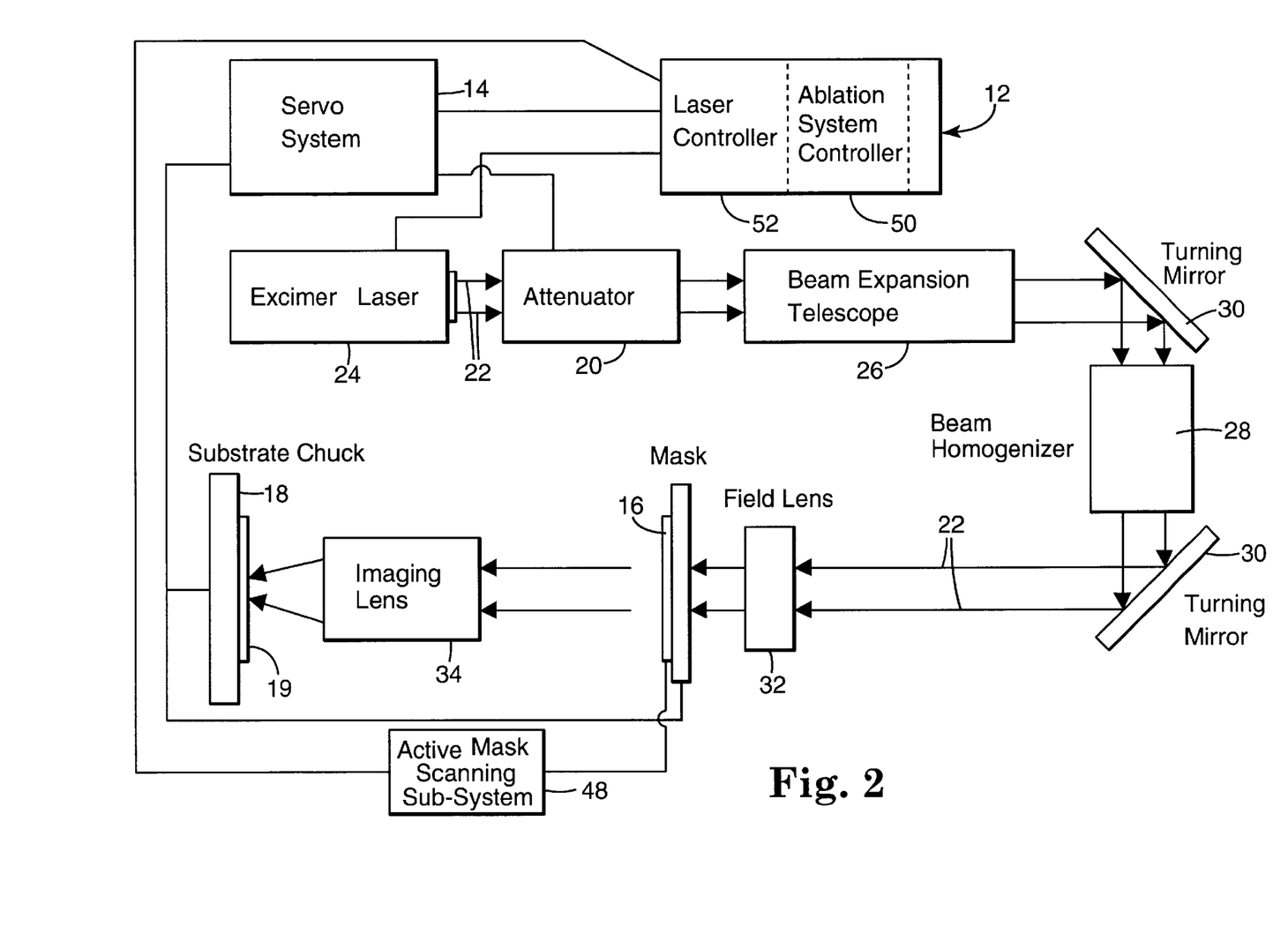
FIG. 2 illustrates a laser machining system using a compound mask motion device during the ablation process.

In contrast to the machining system of FIG. 1, the mask 16 used in the practice of the present invention is capable of moving at high speeds and high resolution in a plane perpendicular to the optic axis of the system during irradiation of the substrate. FIG. 2 schematically represents this concept of a laser system including a high speed active mask scanning subsystem 48 integrated with laser control which is "piggybacked" onto the low speed servo system 14. The light from the beam conditioning optics (which may consist of the components described in FIG. 1 of attenuator, beam expansion, homogenization, and field lenses, as appropriate for the application) sufficiently overfills the features on the mask 16 so that mask motions on the order of approximately +/−100 microns or less (caused by high speed scanning subsystem 48) can be achieved within the homogeneous region of the illumination field. The light passing through the mask is then imaged by imaging lens 24, onto the fixed substrate 19. It will be appreciated by those skilled in the art that the schematic illustration of FIG. 2 is non-limiting, and other control systems may also be suitable.

A mask used in the practice of laser ablation is well known. One representative example of a type of mask which can be used in the practice of this invention is described in U.S. Pat. No. 5,378,137, incorporated herein by reference. Typically, a mask comprises a clear, fused quartz substrate having a thin opaque or reflective layer. The opaque material may be a layer of chrome that has been sputtered onto the substrate, an ultraviolet enhanced coating, or any other suitable reflective or otherwise opaque coating, such as multi-layer dielectric coatings. The reflective or opaque coating on the mask is patterned such that it comprises a series of apertures or other structures through which the light passes, ultimately illuminating the substrate. Each aperture of the mask corresponds to a resulting feature in the substrate.

The type of laser employed will be a function of the substrate to be ablated. For instance, the polymer film used to make inkjet print heads and electronic packaging applications is typically a polyimide, such as Kapton™ and Upilex™, having a thickness of approximately 2 mils. For these applications an excimer laser is commonly employed, such as KrF excimer (248 nanometers), or XeCl excimer (308 nanometers). Alternatively, for features larger than about 35 microns, a TEA $CO_2$ laser may be used to ablate polyimides. In general, the excimer laser commonly produces a pulse width of about 30 nanoseconds, which is very fast on the time scale of laser repetition rate and mask motion. The power of the laser may be selected depending on number and type of optical components in the system to deliver a fluence at the substrate in the range from about 400 to about 1000 or more millijoule/$cm^2$.

In the practice of this invention, when the substrate is a polymer such as a polyimide film, the polymer may be provided from a reel and positioned on the substrate stage in the laser system. The laser is then repeatedly pulsed for a predetermined amount of time to ablate the polymer to form a pattern of ablated features. A variety of factors affect the geometry of the feature, including use of structures in the mask, laser power, fluence, number of laser pulses, and so forth, in addition to the mask trajectory of this invention. The finished polymer is then removed, with fresh polymer being positioned on the stage.

The mask 16 movement can be achieved in variety of ways. As described above, the mask 16 can be mechanically moved through the use of an electromechanical servo motor or its equivalent which is connected, directly or indirectly, to the mask. Such a servo system is adequate for low speed, low resolution motion, such as initial alignment of the mask 16 and substrate 19. However, such a servo system is not useful for providing the high speed, high resolution movements necessary in the laser machining operation due to the typically high system inertia and other factors, which are discussed in greater detail below.

For high speed, high resolution movement, the mask 16 is connected to a piezoelectric material or apparatus, such as a linear or rotary piezoelectric micropositioner, which is "piggybacked" onto low speed servo system 14. Representative, non-limiting examples of such micropositioners are available from Physik Instrumente. Such micropositioners may have typical resolutions of 0.1 µm, having varying travel ranges, rotary angle speeds, and velocity ranges. The aforementioned mechanisms can be readily connected to the mask using conventional techniques.

Figure 3:
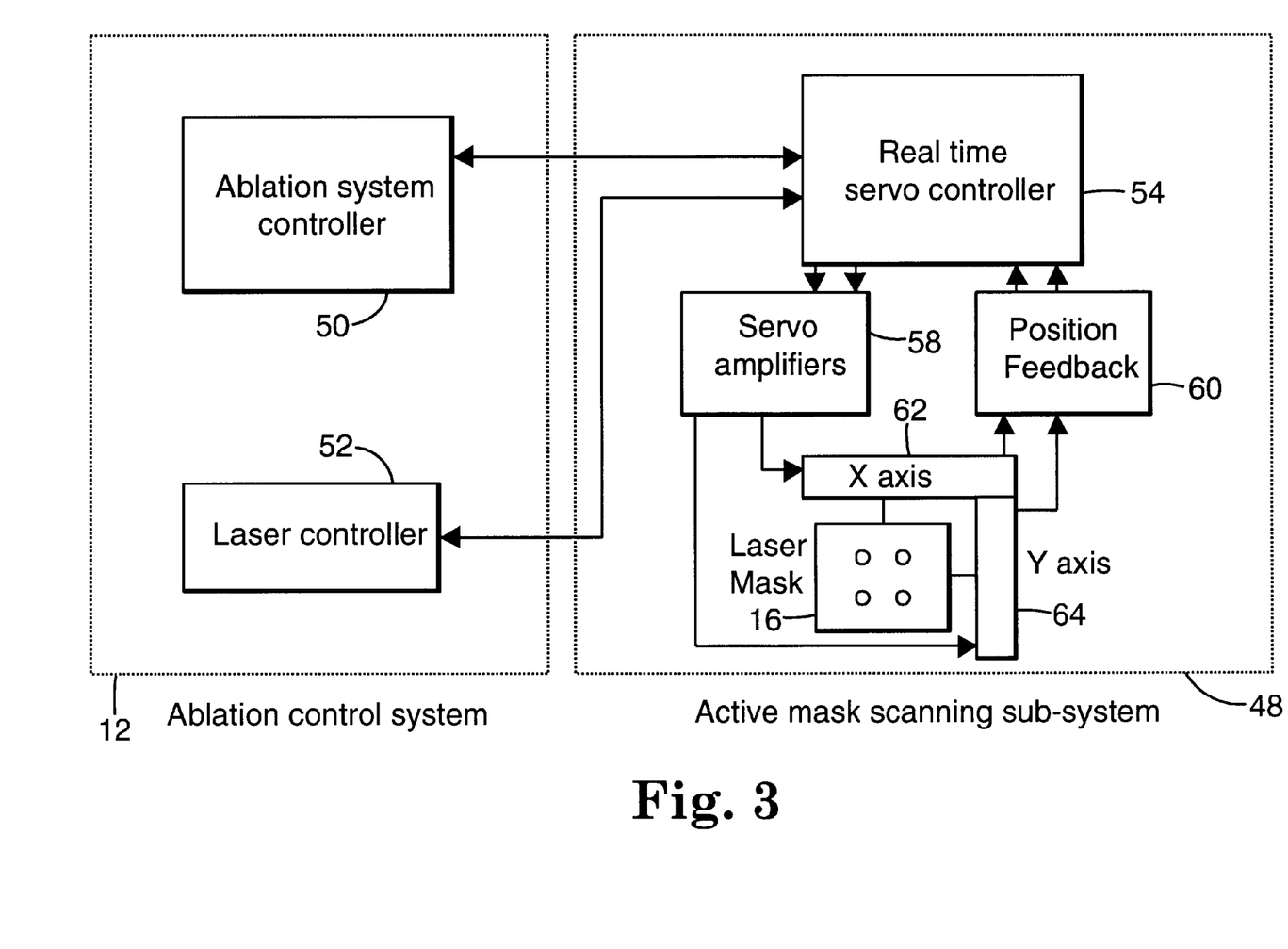
FIG. 3 illustrates one possible system hardware architecture for controlling motion of the mask.

The mask scanning system hardware architecture is illustrated in FIG. 3. This is one representative and non-limiting architecture. Referring to FIG. 3, the laser machining system is usually controlled by a computer or microcontroller 12, which includes an ablation system controller 50 and a laser controller 52 which controls the laser light source 24. Both ablation system controller 50 and laser controller 52 communicate with a real time servo controller 54 that manages the x,y motion of the laser mask 16, through x-axis and y-axis micropositioning motion stages 62, 64, respectively. A position feedback system 60 sends real time position information back to the real time servo controller 54 (referred to as "closed loop" control). Possible feedback devices include, but are not limited to LVDT sensors, strain gauge sensors, capacitive sensors, and inductive sensors.

When the laser source is a high pressure gas discharge laser, such as an excimer or TEA $CO_2$ laser, then the output characteristics of the laser are highly dependent upon a steady firing or repetition rate. A typical repetition rate may be 200–300 Hz. If the laser is fired at an unsteady repetition rate, the refreshing of the gas between the electrodes may be incomplete or vary from laser shot to laser shot, charging of the high voltage capacitors may vary, and perhaps other undesirable effects. Further, the laser manufacturer typically optimizes the laser for the case of steady firing of the laser. Thus, the need for optimal laser performance in turn places rigorous timing demands on the motion control of the mask micropositioning motion stages 62, 64. This is further compounded by the high firing rates of the laser, thereby demanding a relatively high bandwidth for the overall positioning system (consisting of mask 16, the mask holder, micropositioners 62, 64, servo amplifiers 58, position feedback device 60, and real time servo controller 54. The high firing rates of the laser preclude the use of a conventional servo system, as such a system is too slow to provide accurate movement at rates of 200–300 Hz.

The overall system bandwidth is a function of several system components. In particular, the mechanical system may have some inherent time constant. For example, the position feedback device 60 can affect system bandwidth, and the actuator providing the motion can have some delay. For example, moving a piezo device is similar to charging a capacitor through a resistor, and therefore has some inherent RC time constant. In addition, the power supply for the servo or piezo system usually has some impedance or time constant. Therefore, the overall system performance must be considered as a whole when designing the system, and the components must be selected and tested to provide a motion bandwidth appropriate for the desired repetition rate of the radiation source.

For a given hardware set, several different control schemes are possible. The least complex way to implement this invention would be to trigger the laser after the motion control system is in position (within some prescribed following error). However, as discussed above, for best laser performance the laser must fire at a steady repetition rate, which would be difficult with this type of control scheme. In addition this type of control scheme would likely not achieve the highest material throughputs, which is an important economic consideration. Any practical control scheme must therefore accommodate the steady firing of the laser in the range of 200–300 Hz, and, at the same time, place the mask within some small tolerance of the desired position when the laser fires to achieve a repeatable laser machining process.

Figure 4:
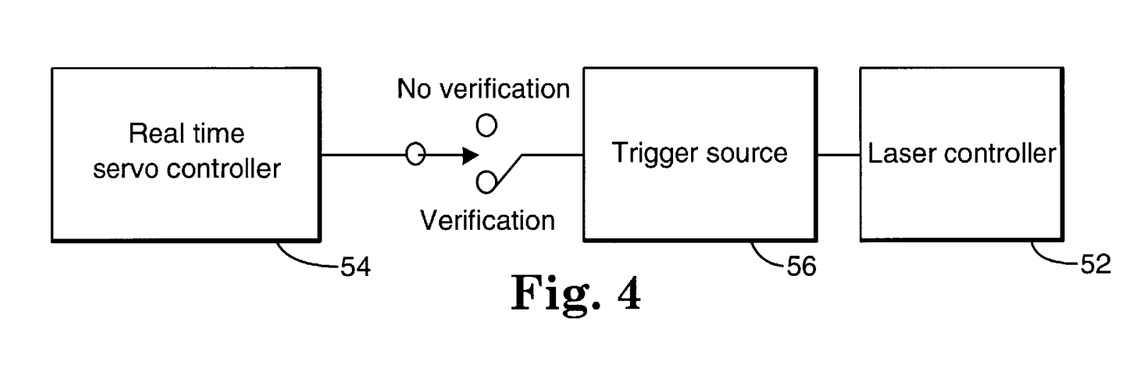
FIG. 4 illustrates trigger feedback to the servo control system.

FIG. 4 schematically illustrates the concepts associated with the timing of the laser firing and motion control systems. First, the real time servo controller 54 for the mask motion may or may not be connected to the laser trigger source 56. Laser trigger source 56 determines the laser firing rate with its steady clock output by its connection to the laser controller, 52. When real time controller 54 is not connected to trigger source 56, the internal time base of the real time controller 54 generates the sequence of times at which the mask is to be in a desired position. In this case, 30 an external signal (such as from the ablation system controller 50) is required to synchronize the start of the laser burst and mask motion. In a preferred embodiment, the real time servo controller 54 is connected to the trigger source 56, allowing data capture of the actual mask position at time of laser firing (within hardware speed limitations). There are several possible choices of trigger sources, including the internal clock of the real time servo controller 54, the internal clock of the laser controller 52, or an external clock.

Figure 5:
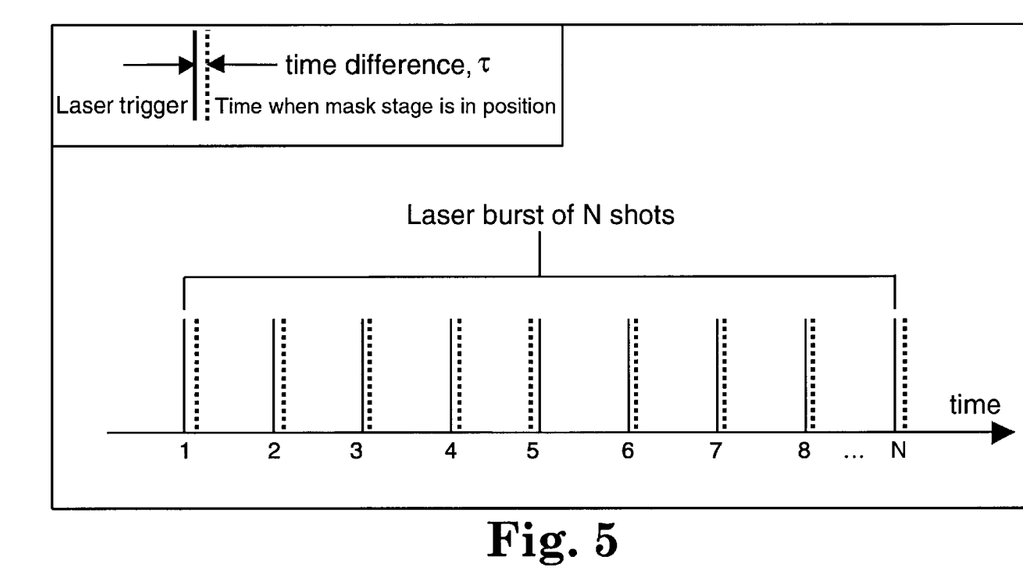
FIG. 5 illustrates the time difference between a laser pulse and when the mask is in position.

FIG. 5 shows a time sequence of a "burst" of several laser shots, represented by the regularly spaced solid bars. In general, due to propagation delays, servo following errors, system inertia, and other inherent system factors, the time when the mask is in the desired (x,y) position will vary somewhat from the regularly occurring laser pulses. In FIG. 5, the time at which the mask is in position (within a sufficiently small tolerance) is represented by the dashed bars. The time difference between these two is represented by τ. The error in the position of the mask is approximated by the product of τ and the instantaneous velocity of the mask.

The effect of the mask position error on the final ablated results is reduced by an amount proportional to the demagnification of the imaging lens, which is typically in the range of 2×–5×. For high precision applications, placement errors of the light pattern on the substrate of less than 0.2 microns are desired. Thus, for a 5× demagnification system, this translates to a mask position error of 1 micron or less. With trigger source verification, the actual position of the mask can be calculated within a time period determined by the system propagation delays, the speed of the position feedback device and the speed of data capture. Within these inherent limitations, the mask position can be quantified at the time of laser firing. A laser firing at 250 Hz corresponds to 4 ms between laser shots, while the error in capturing the mask position is typically less than 30 microseconds.

Different control schemes are possible for use in conjunction with the system architecture described above. However, in the preferred embodiment, a set of position, velocity, and time ("PVT") vectors are pre-calculated. These vectors include the x,y positions of desired mask locations corresponding to the laser triggering. However, they also contain PVT information for a number of points between the actual laser trigger points. By precalculating these intermediate points in the motion profile, the system performance can be optimized by selecting a trajectory to minimize the resonant frequency of the overall system and its harmonics. The PVT vectors are loaded into the real time servo controller 54 in advance of laser processing. The servo controller 54 continuously adjusts the mask velocity to reach the specified positions at the specified times.

It will be recognized that such a control system may be operated in either a synchronous manner (where laser firing and high speed movement of the mask are controlled from the same clock source), or in an asynchronous manner (where laser firing and high speed movement of the mask are controlled from independent clock sources). Synchronous operation is preferred for greater accuracy. Also, control systems may use a "closed loop" control, where feedback is provided about the position of mask 16 during the ablation process, or an "open loop" control where no feedback about the position of mask 16 is provided during the ablation process. The preferred "PVT" control system described above uses closed loop control, although open loop systems could also be used.

The system software is parametric in nature and the preferred embodiment is a multi-threaded software architecture. PVT vectors for the motion trajectory and time interval are read from the ablation controller 50. Intermediate trajectory points and velocities are calculated in such a way as to make the most efficient mask movement given the system bandwidth. Multiple threads are used to manage the flow of information to the real time servo controller 54, which is synchronized with the ablation controller 50. Position feedback system 60 provides data back to the ablation controller 50.

Figure 6:
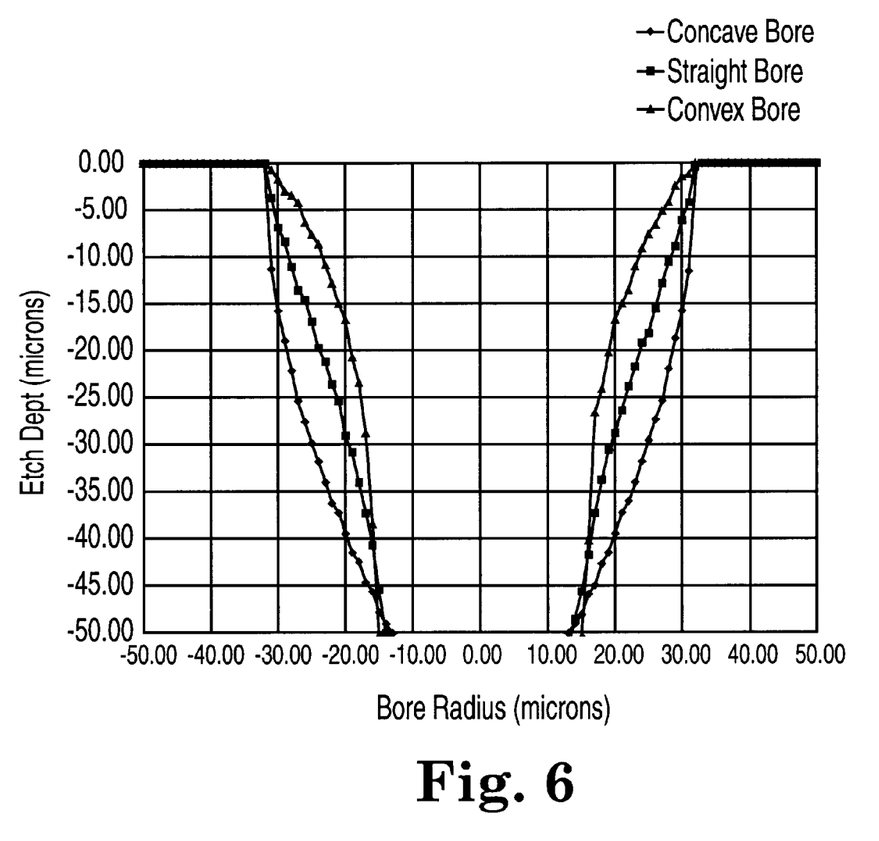
FIG. 6 illustrates different bore profiles which may be created with the present invention.

FIG. 6 illustrates how the ablated feature in the substrate can have a straight, concave, or convex wall shape, as measured from the bore axis. The wall shape may be adjusted by selectively controlling the motion of the mask 16 as describe above, which allows material to be ablated at different rates from inside the hole and thereby create different wall shapes. The ability to modify the pattern of laser shots (and thereby shape the wall of the bore) by simply changing the motion of the mask 16 is a powerful and flexible process parameter which has been unavailable heretofore.

Figure 7:
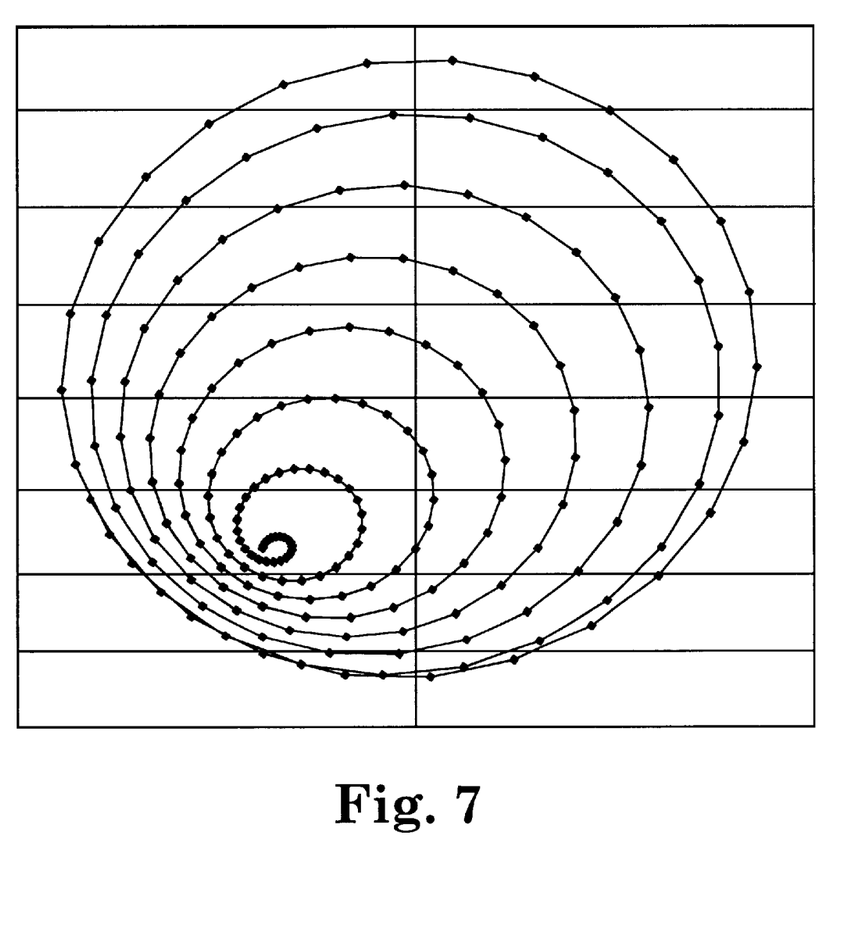
FIG. 7 illustrates a laser shot pattern which may be created using the present invention for creating a nozzle having an axis which is non-orthogonal to the substrate surface.

A particularly useful ability of the present invention allows the ablated features to have an axial orientation which is not perpendicular to the surface of the substrate. That is, the axis of the orifice may be tilted with respect to the substrate surface. Such a variable axial orientation of the orifice is achieved by creating a spiraling laser shot pattern (as depicted in FIG. 7), while allowing the center of each circular "orbit" to slowly drift in a prescribed direction during the ablation process. Such a laser shot pattern is not possible with, for example, a single rotating optical element as shown in U.S. Pat. No. 4,940,881 which can only move the light in a circular pattern.

Figure 8:
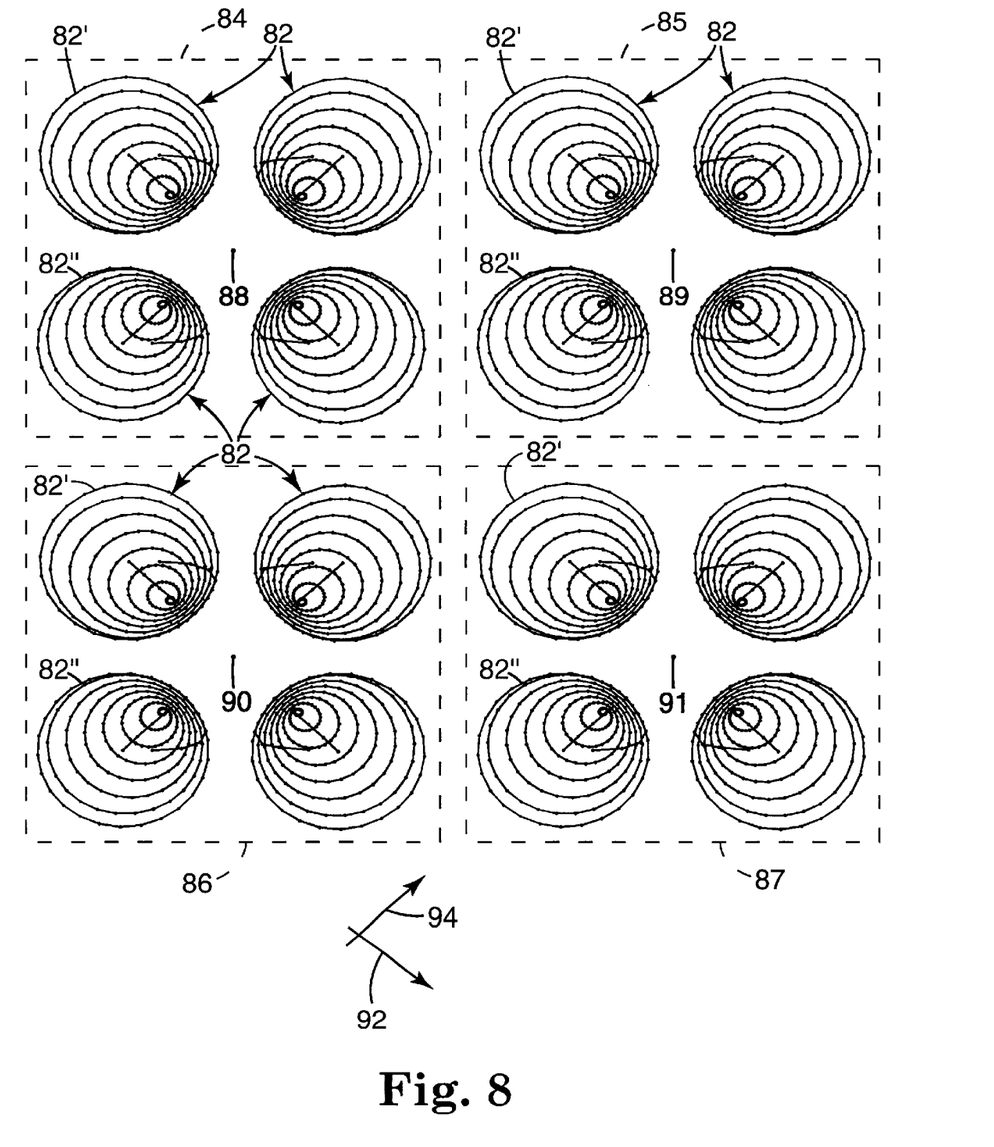
FIG. 8 illustrates nozzle arrays in which the longitudinal axes of arrays of nozzles are inclined in predetermined directions, for the purpose of directing fluids exiting the nozzle arrays and controlling the relative direction of the exiting fluids.

The ability to create an ablated orifice with a non-orthogonal axis is a significant advance and advantage in fluid flow applications. For example, as shown in FIG. 8, a group of two or more nozzles may be positioned such that the axis of each nozzle is directed toward a common predetermined point. In FIG. 8, individual nozzles 82 are arranged in arrays 84, 85, 86, 87, with four nozzles 82 per array 84, 85, 86, 87. In each array 84, 85, 86, 87, the nozzles 82 are angled toward a common point 88, 89, 90, 91, respectively, in the center of each array 84, 85, 86, 87. Such an orientation of the nozzles 82 within each array 84, 85, 86, 87 significantly improves, for example, the ability to control the direction in which a fluid drop is projected through each nozzle 82. This control thereby allows or prevents, for example, the coalescence of drops after exiting the nozzles 82. Alternatively, it can control the relative placement of drops of fluid on a target material, such as placement of ink from an inkjet print head on paper, thereby effecting the quality of print. It will be recognized by those skilled in the art that any number of nozzles and arrays may be ablated to achieve the necessary result for a particular application.

It can be seen from examining FIG. 8 that the axis of at least one nozzle 82' in each of arrays 84, 85, 86, 87, is aligned with a first common axis 92, while a second nozzle 82" of each array 84, 85, 86, 87 is aligned with a second common axis 94. Similarly, each nozzle 82 of each array 84, 85, 86, 87 is aligned with a predetermined common axis. When forming arrays 84, 85, 86, 87, the nozzles 82' are ablated in one step, nozzles 82" are ablated in a separate step, and so on. The different directional axes of the nozzles 82 are created by simply changing the ablation pattern by altering the motion of the mask in a predetermined manner.

As noted above, the nozzle arrangement illustrated in FIG. 8 is useful in applications where control of the individual drops exiting the nozzles is desired, for example, to allow or prevent the coalescence of drops after exiting the nozzles 82. The tendency for individual drops to coalesce or not can be controlled by altering the orientation of the longitudinal axes of the nozzles in each array. Particular uses include print heads for ink jet printers (having nozzles with exit diameters in the range of 8 to 35 microns, and preferably between 10 and 25 microns) and aerosol nozzles plates for applications such as medicinal inhalers (having nozzles with exit diameters of less than about 5 microns diameter and preferably in the range of 0.5 to 3.0 microns).

The inventive mask orbiting apparatus described herein provides significant advantages over other methods of controlling the wall shape of an ablated feature. In particular the invention allows precise, repeatable placement of individual laser shots in any of a variety of manners. The individual laser shots may be placed in widely varying yet easily controllable patterns to achieve the desired wall shape and axial orientation of the ablated feature.

What is claimed is:

1. A process for forming an arbitrarily chosen complex shape for an ablated feature in a substrate, where the feature is ablated using a laser machining system including an imaging mask and an imaging lens system, the process for controlling the shape of the ablated feature comprising:

providing a mechanism for moving an imaging mask, the mask positioned between a laser and the imaging lens system; identifying a plurality of discrete sequential ablation positions on a substrate at which the substrate is to be ablated to form an arbitrarily chosen complex shape for an ablated feature;

calculating a plurality of sequential positions for the mask to direct an image of the mask through the imaging lens to each of the sequential ablation positions; and continuously moving the mask such that the mask moves through each of the sequential mask positions and causes the image of the mask to move through each of the sequential ablation positions, the movement of the mask such that at each of the sequential mask positions a pulse of radiation is fired from the laser, the pulse of radiation irradiating the substrate with radiation that has passed through the mask and the imaging lens system to each sequential ablation position on the substrate to form an ablated feature in the substrate.

2. The process of claim 1 wherein the mask is moved by a piezoelectric positioner that is attached to the mask.

3. The process of claim 1, wherein the mask is a patterned metallic mask.

4. The process of claim 1 wherein the substrate is a polymer film.

5. The process of claim 1 wherein the feature is an inkjet nozzle in a polyimide film.

6. The process of claim 1 wherein the arbitrarily selected ablated feature has a wall shape which is substantially convex.

7. The process of claim 1 wherein the arbitrarily selected ablated feature has a wall shape which is substantially concave.

8. The process of claim 1 wherein the arbitrarily selected ablated feature has a wall shape which is substantially straight.

9. The process of claim 1, wherein the mask is a patterned dielectric mask.

10. The process of claim 1, wherein the mask is formed on a fused silica substrate.

11. The process of claim 1, wherein the mask is formed on a fused quartz substrate.

12. The process of claim 1, wherein the ablated feature has an exit diameter in the range less than about 30 microns.

13. The process of claim 1, wherein the laser pulses in the range of 200–300 Hz.

14. An apparatus useful for forming an arbitrarily chosen complex shape for an ablated feature in a substrate, the apparatus comprising:

a pulsed laser source;

a mask positioned between the laser source and a substrate to be irradiated with radiation from the laser source; and a mechanism for continuously moving the mask in a two-dimensional pattern through a series of predetermined sequential mask positions in a plane perpendicular to the optical system axis such that when each pulse of radiation is fired from the laser source the mask has moved to the next sequential mask position.

15. The apparatus of claim 14 wherein the laser source is an excimer laser.

16. The apparatus of claim 14 wherein the mask is moved by a piezoelectric positioner that is attached to the mask.

17. The apparatus of claim 14 wherein the mask is moved by a voice coil positioner that is attached to the mask.

18. The apparatus of claim 14 wherein the mask is comprised of a fused quartz base and at least one area of a dielectric layer that at least partially reduces radiation transmission through the mask.

19. The apparatus of claim 14 further comprising a projection lens between the mask and the substrate.

20. The apparatus of claim 14, wherein the laser source pulses in the range of 200–300 Hz.

* * * * *